United States Patent
Fejzuli

(10) Patent No.: US 8,821,132 B2
(45) Date of Patent: Sep. 2, 2014

(54) DEVICE AND METHOD FOR PREPARING LIQUEFIED NATURAL GAS (LNG) FUEL

(75) Inventor: Besim Fejzuli, Effretikon (CH)

(73) Assignee: Burckhardt Compression AG, Winterthur (CH)

(*) Notice: Subject to any disclaimer, the term of this patent is extended or adjusted under 35 U.S.C. 154(b) by 615 days.

(21) Appl. No.: 12/921,427

(22) PCT Filed: Mar. 10, 2009

(86) PCT No.: PCT/EP2009/052766
§ 371 (c)(1),
(2), (4) Date: Dec. 7, 2010

(87) PCT Pub. No.: WO2009/112479
PCT Pub. Date: Sep. 17, 2009

(65) Prior Publication Data
US 2011/0103976 A1  May 5, 2011

(30) Foreign Application Priority Data

Mar. 10, 2008 (EP) .................................. 08102472
Mar. 19, 2008 (EP) .................................. 08102786

(51) Int. Cl.
*F04B 25/00* (2006.01)
*F04B 49/035* (2006.01)
*F04B 41/02* (2006.01)
*B63J 99/00* (2009.01)
*F04B 41/06* (2006.01)

(52) U.S. Cl.
CPC .............. *F04B 41/06* (2013.01); *Y02T 70/5263* (2013.01); *F04B 41/02* (2013.01); *B63J 99/00* (2013.01); *Y02T 70/5218* (2013.01); *F04B 25/00* (2013.01); *B63J 2099/003* (2013.01)
USPC ............................ 417/266; 417/258; 417/307

(58) Field of Classification Search
USPC ......... 417/244, 251, 252, 254, 258, 265, 266, 417/302, 304, 307, 440
See application file for complete search history.

(56) References Cited

U.S. PATENT DOCUMENTS 1,855,673 A * 4/1932 Hansen .......................... 417/253
2,690,292 A * 9/1954 Schmidlin ..................... 417/252
(Continued)

FOREIGN PATENT DOCUMENTS

CA    1292213    6/1987
CN    1030813    2/1989
(Continued)

OTHER PUBLICATIONS

International Search Report, mailed Jul. 27, 2009 for PCT International Application No. PCT/EP2009/052766.
(Continued)

*Primary Examiner* — Peter J Bertheaud
(74) *Attorney, Agent, or Firm* — Pearl Cohen Zedek Latzer Baratz LLP

(57) ABSTRACT

Apparatus (1) for providing a supply of natural gas fuel comprising a compressor (2) having an inlet (3) for a stream of natural gas (4), wherein the inlet (3) may be placed in fluid communication with an LNG storage tank (5) in order to provide a supply of boil-off gas (6) from out of the LNG storage tank (5), and an outlet (7) which may be placed in fluid communication with a natural gas supply pipe (8), characterised in that the compressor (2) comprises a first and subsequently a second compression stage (9, 10), wherein the first and the second compression stage (9, 10) take the form of labyrinth-sealed piston-compressors (11, 12) or piston-ring-sealed piston-compressors (15), and wherein the first compression stage (9) features a larger piston diameter than the second compression stage (10), and that the compressor (2) comprises at least a third subsequent compression stage (13, 14), which takes the form of a piston-ring-sealed piston-compressor (11, 12) or a labyrinth-sealed piston-compressor (15).

9 Claims, 6 Drawing Sheets

(56) References Cited

U.S. PATENT DOCUMENTS

| | | | |
|---|---|---|---|
| 3,190,545 A | 6/1965 | Weber et al. | |
| 3,216,648 A * | 11/1965 | Ford | 417/53 |
| 3,285,503 A | 11/1966 | Bancroft | |
| 3,775,988 A * | 12/1973 | Fekete | 62/640 |
| 4,920,862 A | 5/1990 | Muller | |
| 5,066,202 A * | 11/1991 | Berges et al. | 417/228 |
| 5,078,580 A * | 1/1992 | Miller et al. | 417/265 |
| 5,711,270 A | 1/1998 | Pedersen | |
| 5,863,186 A * | 1/1999 | Green et al. | 417/53 |
| 6,589,024 B2 * | 7/2003 | Nishikawa et al. | 417/273 |
| 6,776,587 B2 * | 8/2004 | Meyer et al. | 417/248 |
| 6,776,588 B1 * | 8/2004 | Arndt et al. | 417/250 |
| 7,204,249 B1 * | 4/2007 | Richey et al. | 128/204.18 |

FOREIGN PATENT DOCUMENTS

| | | |
|---|---|---|
| DE | 10 85 642 | 7/1960 |
| DE | 11 95 427 | 6/1965 |
| DE | 21 55 335 | 5/1973 |
| DE | 22 16 736 | 10/1973 |
| EP | 1 348 620 | 10/2003 |
| EP | 1956287 | 8/2008 |
| JP | S-60-81400 | 6/1985 |
| JP | 01-113581 | 5/1989 |
| JP | 04-231686 | 8/1992 |
| JP | 10-227398 | 8/1998 |
| JP | 2006-177618 | 7/2006 |
| JP | 2006-348752 | 12/2006 |
| KR | 10-0805022 | 8/2008 |
| WO | WO 2006/077094 | 7/2006 |

OTHER PUBLICATIONS

Office Action for Chinese Application No. CN20098108614 dated May 9, 2013.

Office Action dated Jun. 25, 2013 for Japanese Patent Application No. 2010-550168 (English translation only).

* cited by examiner

US 8,821,132 B2

DEVICE AND METHOD FOR PREPARING LIQUEFIED NATURAL GAS (LNG) FUEL

CROSS-REFERENCE TO RELATED APPLICATIONS

This application is a National Phase Application of PCT International Patent Application No. PCT/EP2009/052766, International Filing Date Mar. 10, 2009, which claims priority from European Patent Application No. EP 08102472.1, Filing Date Mar. 10, 2008, and European Patent Application No. EP 08102786.4, Filing Date Mar. 19, 2008.

FIELD OF THE INVENTION

The invention relates to an apparatus as well as a method for providing a supply of natural gas fuel.

BACKGROUND OF INVENTION

Background Art

Liquefied natural gas, known in German as "Flüssiges Erdgas" or referred to in abbreviated form as "LNG", is natural gas which has been cooled to a temperature of −162° C. and has thereby taken on a liquid state. Nowadays a large number of natural gas sources are known of which are unfortunately a very long way away from the end-consumers. One cost-effective way of transporting natural gas over long distances is to liquefy the natural gas and to transport it in tanker ships, also known as LNG-tankers. The liquid natural gas is transformed back into gaseous natural gas at the destination.

The document WO 2006/077094 discloses an apparatus as well as a method which make it possible to use the natural gas transported by the LNG-tankers as a source of fuel for driving the motors of the LNG-tanker. As described in detail in the document, a boil-off gas, develops in the upper area of a storage tank which contains liquefied natural gas. This boil-off gas is taken from the storage tank, then compressed and subsequently supplied to an engine on the ship, e.g. a combustion engine, as gaseous natural gas.

SUMMARY OF INVENTION

The problem which is to be solved by the present invention is that of suggesting a more advantageous apparatus as well as a more advantageous method which allow a fuel to be extracted from the boil-off gas of liquefied natural gas—a fuel which is particularly suitable for use in the combustion engines of LNG-tankers.

In particular, the problem is solved by an apparatus for providing a supply of natural gas fuel comprising a compressor having an inlet for a stream of natural gas, wherein the inlet may be placed in fluid communication with an LNG storage tank in order to provide a supply of boil-off gas from out of the LNG storage tank, and an outlet which may be placed in fluid communication with a natural gas supply pipe, characterised in that the compressor comprises a first and subsequently a second compression stage, wherein the first and the second compression stage take the form of labyrinth-sealed piston-compressors or piston-ring-sealed piston-compressors, and wherein the first compression stage features a larger piston diameter than the second compression stage, and that the compressor comprises at least a third subsequent compression stage, which takes the form of a piston-ring-sealed piston-compressor or a labyrinth-sealed piston-compressor. In a further advantageous arrangement, there is a fourth compression stage is subsequent to the third compression stage. In a further advantageous arrangement, there is a fifth compression stage subsequent to the fourth compression stage. In a particularly advantageous arrangement, the third compression stage takes the form of a piston-ring-sealed compression stage, as do the fourth and the fifth compression stages, if present. In a further advantageous arrangement, the third compression stage takes the form of a labyrinth-sealed compression stage, as do the fourth and the fifth compression stages, if present. In a further advantageous arrangement, all of the compression stages take the form of either labyrinth-sealed compression stage or piston-ring-sealed compression stage. In a particularly advantageous arrangement, the first and the second compression stage take the form of labyrinth-sealed piston-compressors and the subsequent compression stages take the form of piston-ring-sealed piston compressors.

The apparatus according to the invention has the advantage that a stream of natural gas may be created out of the liquid natural gas, having a pressure of between 100 Bar and 500 Bar, particularly a pressure between 150 Bar and 300 Bar, whereby the stream of natural gas serves as the fuel supply of a combustion engine, preferably a turbine or a piston engine, such as a diesel engine. The apparatus according to the invention is preferably placed on a ship, in particular on an LNG-tanker, and enables the fuel for supplying the combustion engines to be taken from the liquid natural gas stored in the LNG storage tanks. The boil-off gas of the liquid natural gas is normally at a temperature of approximately minus 162° C. and normally at a pressure of 1 Bar. The apparatus according to the invention allows this boil-off gas to be compressed to a preferably variable delivery pressure in the range between 100 Bar and 500 Bar, in particular to a delivery pressure between 150 Bar and 300 Bar.

The labyrinth-sealed piston-compressor has the advantage that it can aspirate and compress natural gas over a wide range of temperatures, preferably between −160° C. to +100° C. The piston-ring-sealed piston-compressor has the advantage that it can compress natural gas up to a high pressure. The combination of labyrinth-sealed piston-compressors and piston-ring-sealed piston-compressors according to the invention has the advantage that it makes it possible to compress natural gas, from a start point of a boil-off gas, very reliably and cost-effectively, which, in particular, enables the motor of an LNG-tanker to be supplied with fuel from the LNG storage tanks which are being transported.

In a preferred arrangement, there is a non-return valve between the second and the third compression stage and the first and second compression stages preferably compress oil-lessly. This arrangement has the advantage that the natural gas compressed in the first and second compression stages is not contaminated and, if necessary, can be fed back to the LNG storage tank. It is advantageous for the second compression stage to consist of a single stage of compressors or to consist of two stages of compressors connected in series, or rather to consist of one piston compressor or of two piston compressors connected in series.

In a particularly preferred arrangement, all of the compression stages are mounted on a shared casing and driven by a shared crank drive mechanism. This results in a very compact compressor which space can be found for, even on a ship. In a preferred arrangement, there are compensatory weights on the crank drive mechanism, to achieve a particularly quiet running compressor which is, in particular, of advantage when in use on a ship.

In a further advantageous arrangement, at least one of the compression stages features a bypass with a controllable valve, for controlling the backflow, and thereby for controlling the delivery volume and/or the delivery pressure of the compression stage.

In the following, the invention will be explained in detail by means of examples of embodiments. In the drawings, identical parts are always indicated with identical reference signs.

BRIEF DESCRIPTION OF THE DRAWINGS

The drawings used for elucidation of the examples of embodiments show.

DETAILED DESCRIPTION OF THE INVENTION

Figure 1:
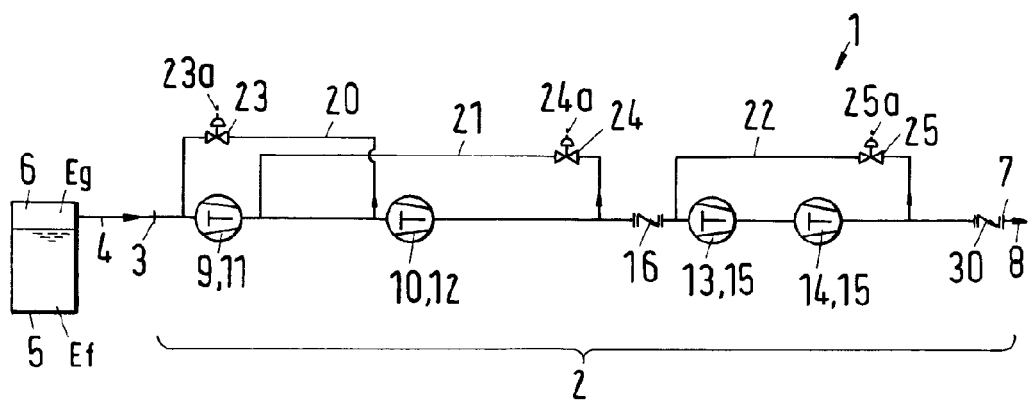
FIG. 1 an example of an embodiment of a compressor in schematic form.

FIG. 1 schematically shows an apparatus 1 for providing a supply of natural gas fuel comprising a compressor 2 with an inlet 3 for a stream of natural gas 4 as well as comprising an outlet 7 which is in fluid communication with a natural gas supply pipe 8 for a combustion engine positioned downstream. The inlet 3 may be placed in fluid communication with an LNG storage tank 5 in which natural gas Ef is stored—normally at a pressure of 1 Bar and a temperature of minus 162° C. Gaseous natural gas Eg, also known as boil-off gas 6, develops above the liquid natural gas Ef. This boil-off gas 6 is aspirated and compressed by the compressor 2 and leaves the compressor 2 at outlet 7 as natural gas preferably under pressure at between 150 Bar and 300 Bar. The compressor 2 is preferably placed on an LNG-tanker where the compressed natural gas preferably serves as fuel for the drive motor.

The compressor 2 comprises a first and subsequently a second compression stage 9, 10, wherein the first and the second compression stages 9, 10 take the form of labyrinth-sealed piston-compressors and wherein the first compression stage 9 features a larger piston diameter than the second compression stage 10. The compressor 2 subsequently comprises a third and fourth compression stage 13, 14 which take the form of piton-ring-sealed piston-compressors 15. The compressed natural gas is then fed to the outlet 7.

In an advantageous arrangement, there is a non-return valve 16 between the second compression stage 10 and the third compression stage 13, such that the natural gas can only flow in one direction. In an advantageous arrangement, all of the compression stages 9,10 which are situated upstream of the non-return valve 16 are oilless, such that compressed natural gas in this section is not contaminated with impurities. The compressor 2 shown in FIG. 1 thus comprises four piston-compressors 11, 12, 15 connected in series.

In an advantageous arrangement, at least one of the compression stages 9, 10, 13, 14 features a bypass 20, 21, 22 with a controllable valve 23, 24, 25 which may be controlled, for example via an electrical wire 23a, 24a, 25a. An advantage of this arrangement is to be seen in that the pressure and/or the delivery volume of natural gas at or flowing through the outlet 7 can thus be regulated.

In the embodiment shown in FIG. 1 there are, in each case, two compression stages connected in series 9,10 or respectively 13, 14. The apparatus 1 could of course also be arranged such that each of the two compression stages 9,10 and/or 13, 14 is made up of a single compression stage or such that, in each case, three compression stages connected in series are used in place of the two shown. Also, the embodiment shown in FIG. 1 could have only a single piston-compressor 15, or could have three piston-compressors 15 connected in series.

Figure 2:
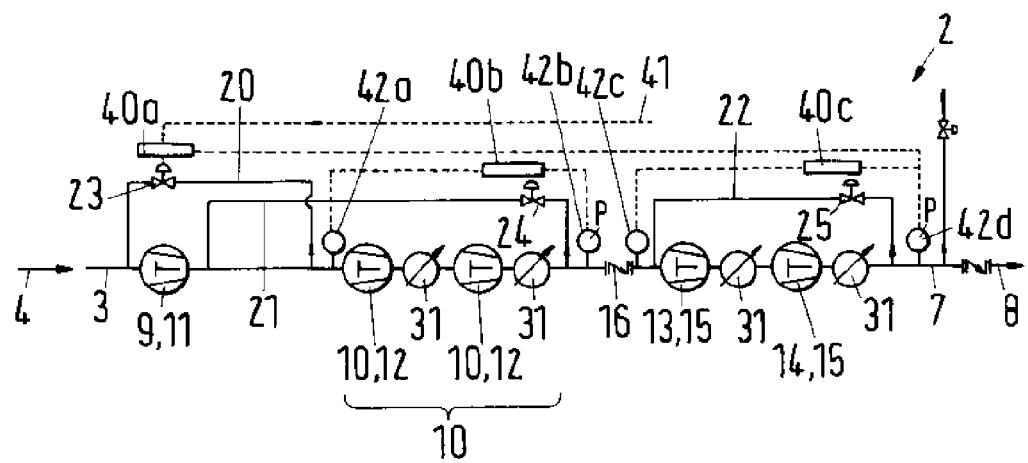
FIG. 2 an example of a further embodiment of a compressor in schematic form.

In comparison with the arrangement shown in FIG. 1, the compressor 2 of a further advantageous arrangement, as shown in FIG. 2, can comprise yet further piston-compressors 11, 12, 15 which form additional compression stages connected in series in order to achieve a higher delivery pressure or compression stages connected in parallel to achieve a greater delivery volume or which have compression stages connected both in series and in parallel. Thus, for example, the first compression stage 9 could consist of two parallel piston-compressors 11 to increase delivery volume. In a preferred arrangement, as shown in FIG. 2, the second compression stage 10 consists of two stages of compressors, in which two series-connected piston-compressors 12 are arranged one after the other in order to increase compression pressure. There is a particular need for an additional stage of compressors in the first or second compression stage 9,10 when aspiration pressure is relatively low. In addition to that, there could also, for example, be at least one additional piston-compressor connected in series in the third and the fourth compression stages 13, 14 in order to raise the delivery pressure of the natural gas. Thus the compressor 2 according to the invention may be arranged in various ways depending on the required or desired natural gas characteristics at the inlet 3 and at the outlet 7, in particular temperature, pressure and necessary delivery volume of natural gas. The compressor 2 shown in FIG. 2 shows a preferred embodiment with five piston-compressors 11, 12, 15 connected in series.

The compressor 2 shown in FIG. 2 comprises a plurality of pressure sensors 42a, 42b, 42c, 42d for measuring the pressure of the natural gas at the respective locations. The compressor 2 additionally comprises 3 regulating devices 40a, 40b, 40c. In the embodiment shown, a target pressure value 41 is provided to the regulating device 40a and the current delivery pressure value 42d is measured in the area of the outlet 7. The regulating device 40a influences the positioning of the valve 23 based on the difference between the current and target values in order to thereby influence the backflow stream in the bypass 20. Analogously, the regulating device 40b compares the pressure 42a, 42b before and after the second compression stage 10 and the regulating device 40c compares the pressure 42c, 42d before and after the third and fourth compression stage 13, 14, in order to influence the positioning of valves 24 and 25 respectively based on these measured values and thereby to influence the backflow stream in bypass 21 and 22. Regulating devices 40a, 40b and 40c could also be connected to a master regulator. As shown in FIG. 2, it can prove advantageous to provide a cooler 31 after the compression stages 10, 13, 14 for cooling the compressed natural gas. The cooler 31 is cooled, for example, with a glycol-water mixture.

Figure 3:
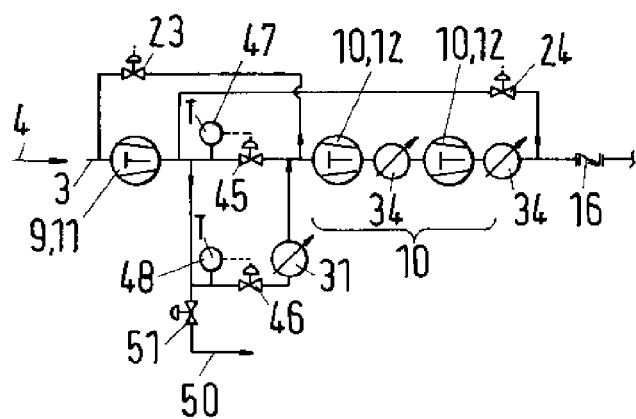
FIG. 3 a schematic representation of a further development of the compressor shown in FIG. 2.

FIG. 3 shows a further advantageous embodiment of that part of the compressor 2, as already shown in FIG. 2, lying to the left of the non-return valve 16. There is a temperature sensor 47 as well as a regulating valve 45 between the first and second compression stage 9,10. Also, as a bypass to the regulating valve 45, there is a regulating valve 46, a temperature sensor 48 as well as a cooler 31. In this way, the natural gas leaving the first compression stage 9 can be temperature-dependently either fed directly to the second compression stage 10 or be fed via the regulating valve 46 and the cooler 31 as cooled natural gas to the second compression stage 10. In addition to that, the compressor 2 can also comprise a returning pipe 50 with flow therethrough controlled by a shut-off valve 51, in which case it is preferable for the returning pipe 50 to be to the left of (i.e. with respect to the natural gas flow, upstream of) the non-return valve 16. The returning pipe 50 can be fed to a reliquefying plant, so that excess natural gas can, for example, be introduced back into the LNG storage tank 5. The returning pipe 50 could also lead to a gas-burner where the natural gas is, for example, flared off.

Figure 6:
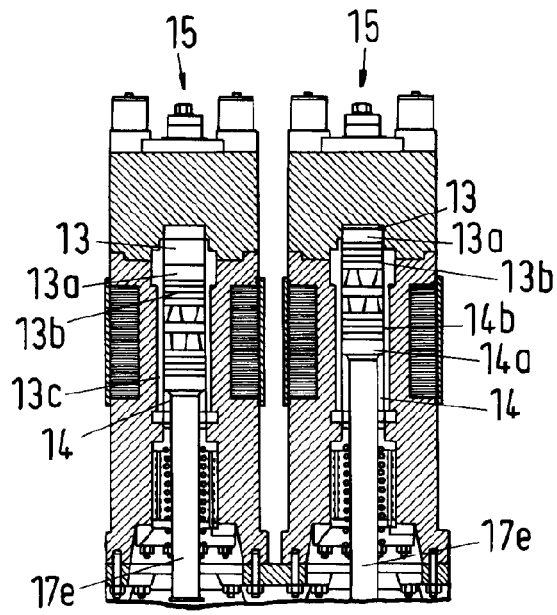
FIG. 6 a further detailed view of the compressor shown in FIG. 4.
Figure 4:
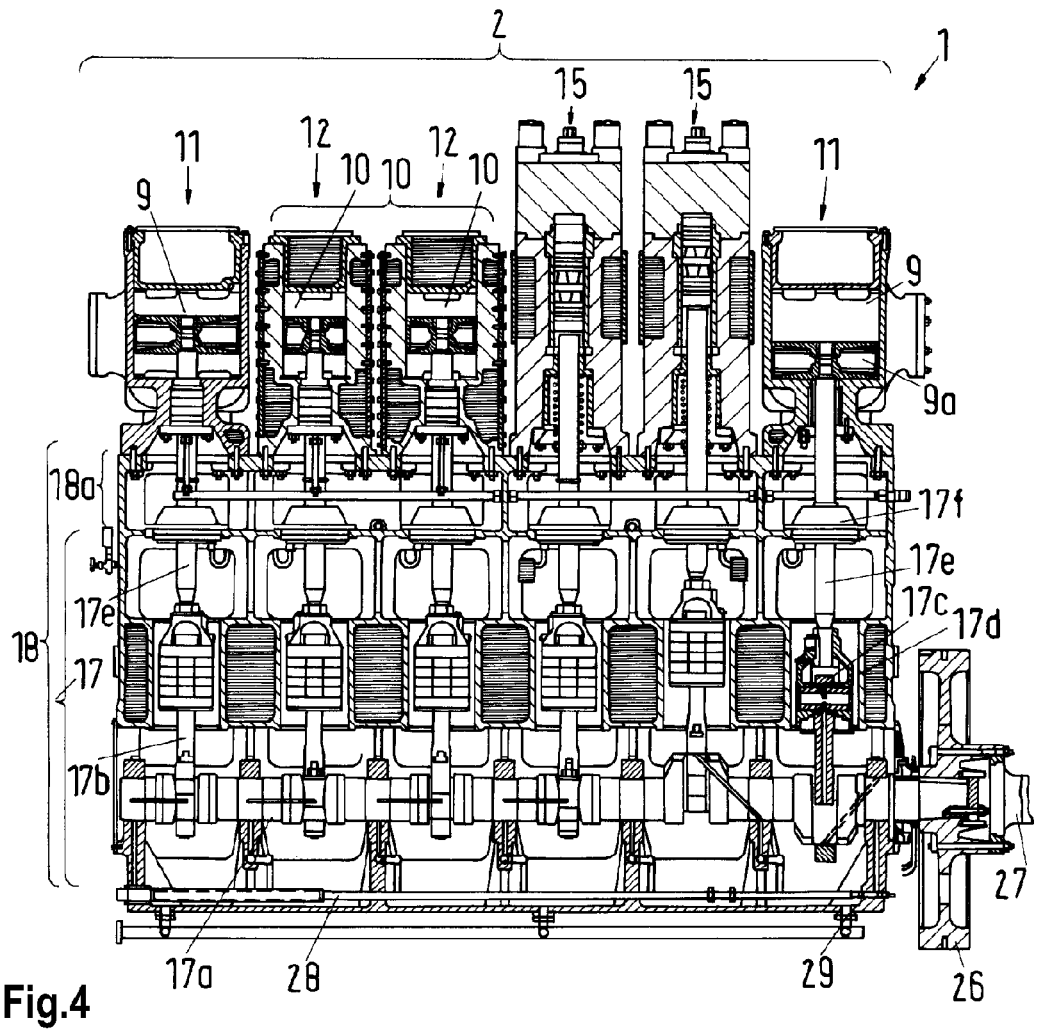
FIG. 4 a section through a compressor.
Figure 5:
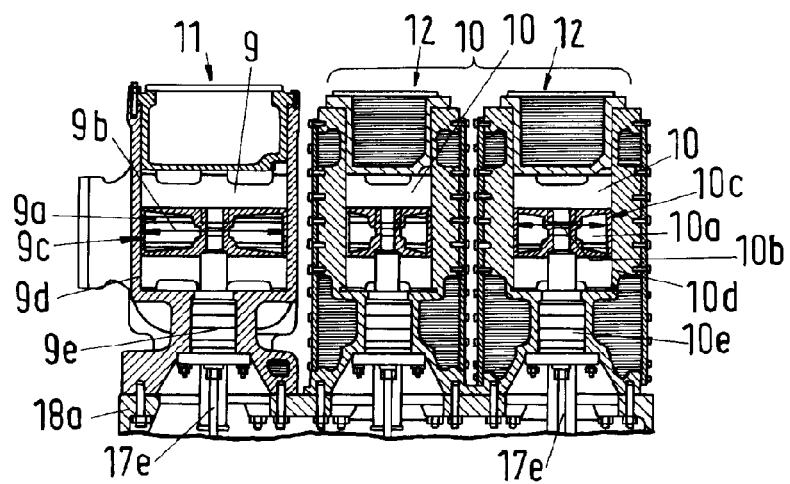
FIG. 5 a detailed view of the compressor shown in FIG. 4.

FIG. 4 shows a detailed cross-section of an example of an embodiment of a compressor 2 according to the invention. The compressor 2 comprises a shared housing 18 with a crank drive mechanism 17 and a spacer part 18a. Comprised in the crank drive mechanism 17 is a bearing-mounted crankshaft 17a, as well as six crossheads 17c which are longitudinally spaced out along the line of the crankshaft 17a and which are coupled with the crankshaft 17a via pushrods 17b, while at the same time, the crank drive mechanism 17 has crosshead-bores 17d, in which the crossheads 17c run, and each crosshead 17c is coupled with a piston rod 17e and each piston rod 17e is coupled with a piston 9a, 10a, 13a, 14a. The crankshaft 17a is coupled with a driveshaft 27 via a weighted flywheel 26. In the depicted embodiment example, six piston-compressors are mounted on a bearing face on top of the spacer part 18. The pistons 9a, 10a, 13a, 14a of the piston compressor 11, 12, 15 are driven by the shared crankshaft 17a via the piston rods 17e. FIGS. 5 and 6 show the piston compressor 11, 12,15 in detail. The compressor 2 comprises a first compression stage 9 with two piston compressors 11, which take the form of labyrinth-sealed piston compressors 11, in which the piston compressors 11 of the compression stage 9 comprise a piston 9a with a piston diameter 9b, as shown in detail in FIG. 5 and, on the outer, cylinder-shaped surfaces of the piston 9a, there is a labyrinth seal 9c, or, as the case may be, a surface structure which effects a non-contact labyrinth seal 9c in conjunction with the cylinder wall 9d. The piston-compressor 11 also comprises a piston rod guide 9e to direct the motion of the piston rod 17e and the piston 9a. Both of the piston-compressors 11 arranged to the left and to the right can be organised in parallel to or in series with each other with respect to the natural gas which is to be compressed. In an advantageous arrangement, the first compression stage 9 has a double-acting cylinder in which both sides of the piston 9a delimit a compression chamber for compressing natural gas. Preferably the first compression stage 9 is made for cryogenic operation and made out of materials suitable for very low temperatures.

The compressor 2 comprises a second compression stage 10 consisting of two piston-compressors 12 connected in series, which also take the form of labyrinth-sealed piston-compressors 12, in which each piston-compressor 12 of the second compression stage 10 comprises a piston 10a with a piston diameter 10b, as shown in detail in FIG. 5 and, on the outer, cylinder-shaped surfaces of the piston 10a, there is a labyrinth seal 10c, or, as the case may be, a surface structure which effects a non-contact labyrinth seal 10c in conjunction with the cylinder wall 10d. In a further embodiment, it would also be possible for the labyrinth seals to be on the cylinder wall 10d and for the cylinder 10a to have a relatively smooth surface. The second compression stage 10 also comprises a piston rod guide 10e to direct the motion of the piston rod 17e and the piston 10a. Both of the neighbouring piston-compressors 12 are preferably organised in series with each other with respect to the natural gas which is to be compressed. The piston diameter 9b of the first compression stage 9a is larger than the piston diameter 10b of the second compression stage 10.

The compressor 2 comprises two piston-ring-sealed piston compressors 15, with each piston compressor 15 taking the form of a double-acting cylinder and having two compression stages, a third compression stage 13 and a fourth compression stage 14, wherein, as shown in detail in FIG. 6, the third compression stage 13 has a piston 13a with a plurality of piston rings 13b as well as a cylinder 13c and the fourth compression stage has a piston 14a with a plurality of piston rings 14b as well as a cylinder 14c. In the embodiment example shown, the third compression stage 13 is above the piston, whereas the fourth compression stage 14 is below the piston. In a further embodiment example (not shown) the third compression stage 13 could be below the piston and the fourth compression stage 14 could be above the piston. Preferably, both piston compressors 15 are connected to each other in series, although they may also be connected in parallel.

The crosshead is oil-lubricated. There are oil scrapers 17f around the piston rods 17e in the spacer part 18a. The shared casing 18 is supplied with lubricating oil by oil supply pipeworks 28 and down below at the base has outlets via which the oil is extracted via oil removal pipeworks 29. This arrangement has the advantage that, since the oil is taken off, no permanently-present oil sump accrues at the base of the housing.

In its most preferable embodiment of the casing 18, there are six crossheads 17c with six corresponding piston rods 17e. Preferably, pairs of the six crossheads 17c, which are longitudinally spaced out along the line of the crankshaft 17a and which are coupled with the crankshaft 17a via pushrods 17b, are coupled offset at a 60° angle with respect to crankshaft 17a rotation. In a preferred arrangement, a compensatory weight 19 is connected with the crosshead 17c and/or with the piston rod 17e. Preferably, the compensatory weight 19 is selected such that each crosshead 17c, corresponding piston rod 17e and connected piston 9a, 10a plus corresponding compensatory weight 19 has essentially the same mass. Such a compensatory weight 19 arrangement gives a compressor 2 that runs very smoothly, in operation. This is of particular advantage where the compressor 2 is operated on a ship, such as an LNG-tanker, since on a ship, no big, heavy foundations are available to be able to conduct vibration forces away along. The compressor 2 according to the invention is thus preferably arranged to exhibit low applied forces and moments and the compressor 2 is therefore particularly well-suited to use on a ship. The compressor 4 shown in FIG. 4 has the advantage that it is very built vary compactly and therefore requires little space and that the compressor 2 may be driven with a single, compactly-built electric motor.

Optimal balancing of vibrational forces may be achieved with the arrangement shown in FIG. 4, comprising a shared casing 18 with six crossheads 17c, spaced out longitudinally along the line of the crankshaft 17a, with pushrods 17b and piston rods 17e. Nonetheless, it can prove advantageous to provide the compressor 2 with less piston compressors 11, 12, 15 than shown in FIG. 4, for example, only with three piston compressors as shown in FIG. 1. In this embodiment example, going from left to right, the compressor 2 of FIG. 4 would only have the first and second piston compressors 11, 12 and the fourth piston compressor 15, whereas the spacer part 18a could be covered with a closing plate over the bearing faces of the third, fifth and sixth position and, at the same time, the piston rods 17e lying thereunder be appropriately shortened such that they don't touch the closing plate. In this embodiment, all six crossheads 17c, push rods 17b and piston rods 17e would preferably still be present, and the compensatory weights 19 would preferably be selected such that each of the six moving corpora has the same mass, thus guaranteeing smooth-running with little vibration. The embodiment shown in FIG. 4 with a crankshaft 17a with six crank throws ensures that applied forces are relatively optimally balanced out and that few vibrational forces develop.

Figure 10:
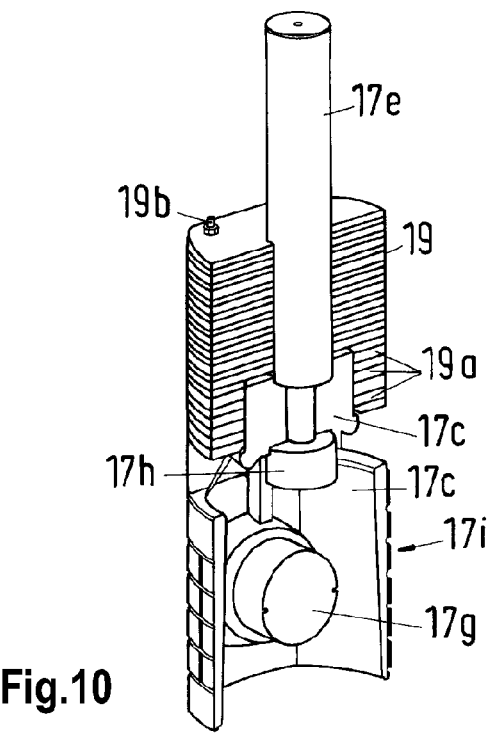
FIG. 10 a longitudinal section through a crosshead with balance weight.
Figure 11:
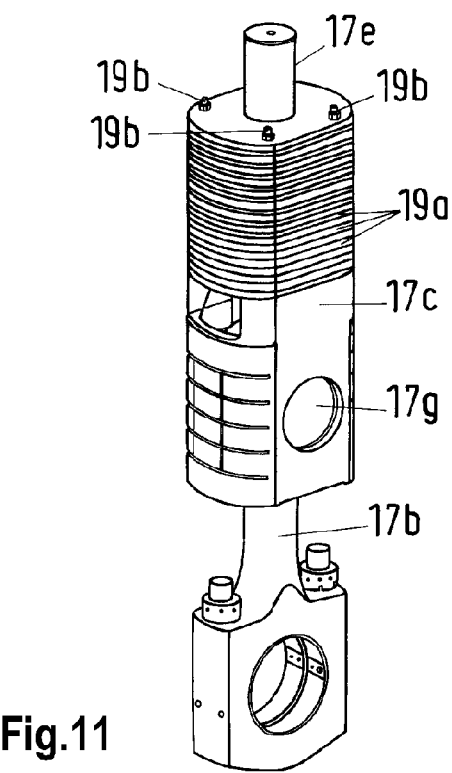
FIG. 11 a side view of a crosshead with balance weight.

FIG. 10 shows a longitudinal section through a crosshead 17c with piston rod 17e, crosshead gudgeon pin 17g, connecting means 17h and guide surface 17i. A balancing weight 19, consisting of a plurality of plates 19a and a fastening means 19b, is rigidly joined to the crosshead 19a and/or to the piston rod 17e. The balancing weight 19 can also be arranged somewhere above the crosshead 17c, in which case the balancing weight 19 is preferably connected to the piston rod 17e. FIG. 11 shows a side view of the arrangement shown in FIG. 10, where the pushrod 17b is coupled with the crosshead 17c via the crosshead gudgeon pin 17g. The balancing weight 19 could be single-piece. However, it is preferable for the balancing weight to consist of a plurality of partial weights 19a, preferably of geometrically identically formed partial weights 19a. In a preferred embodiment, the partial weights 19a are in the form of plates, as shown in FIGS. 10 and 11.

In the compressor 2 shown in FIG. 4, all of the compression stages 9, 10, 13, 14, or rather all of the piston compressors 11, 12, 15, are driven by the same crankshaft 17a. However, it is also possible to divide the casing 18 into two separate casings in which, for example, the first and the second compression stages 9, 10 are arranged on the first casing and the third and fourth compression stages 13, 14 are arranged on the second casing. All of the compression stages 9, 10, 13, 14 could be driven by the same crankshaft 17a. However, in a further embodiment example, two or even more separate crankshafts 17a could also be used, which could also even be driven by separate drives, such as motors.

Figure 7:
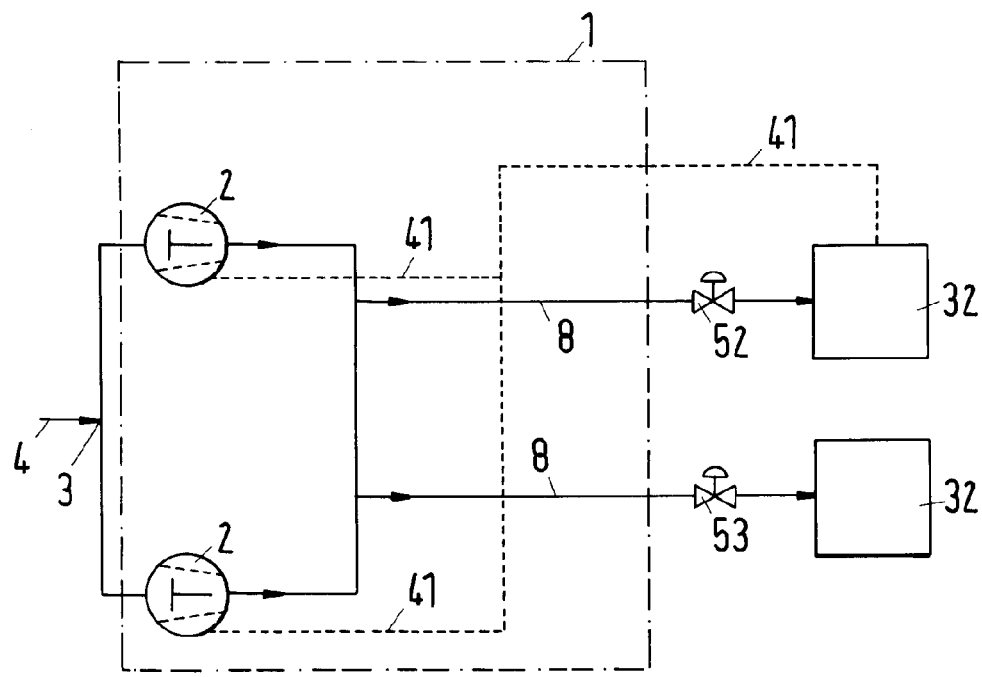
FIG. 7 two compressors arranged in parallel for supplying two diesel engines, in schematic form.
Figure 8:
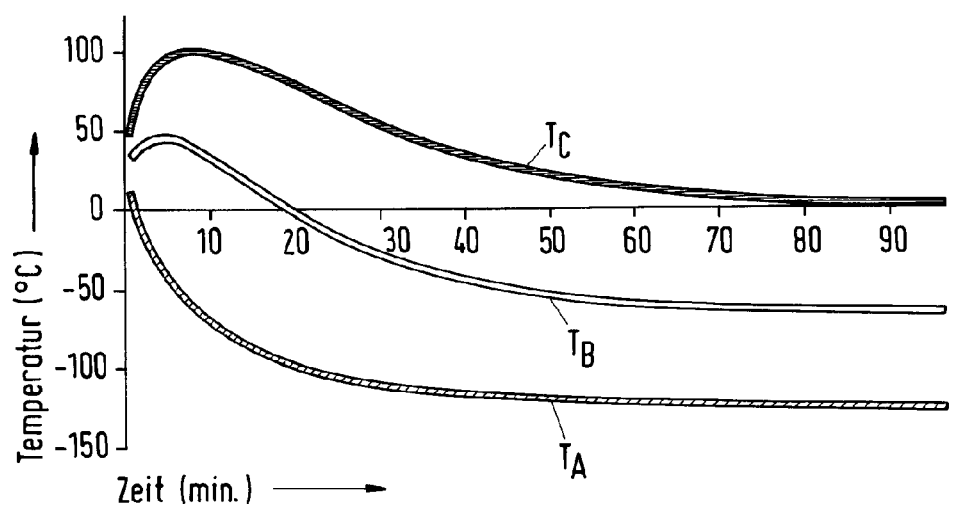
FIG. 8 a graph of temperature of natural gas as a function of time.

FIG. 7 shows schematically an arrangement with two compressors 2 arranged in parallel, to which a stream of natural gas 4 consisting of boil-off gas 6 is supplied via inlet 3. After the compressors 2, compressed natural gas is fed in two natural gas supply pipes 8 to the respective combustion engine 32 via a shut-off valve 52, 53, wherein, for example, the combustion engine 32 is a piston-motor like a ship's diesel motor, which is also suitable for being run on natural gas. The regulator of the combustion engine 32 sets a target pressure value 41 for the supplied natural gas and this target pressure value 41 is supplied to the two compressors 2 as a target value. Preferably, the combustion engine 32 is operated such that, via the target pressure value 41, it demands a certain pressure of gas for a certain level of available power. In a particularly preferred embodiment, the target pressure value 41 is the only control input signal for the compressor 2 shown in FIGS. 1 and 2. In particular, the quantity of gas demanded by the combustion engine 32 is unknown. Both the apparatus according to the invention and the method according to the invention enable a variable quantity of natural gas to be provided at a specified pressure from boil-off gas 6. The labyrinth-sealed piston-compressor 11, 12 has the advantage that it may be run reliably over a wide range of temperatures, in particular even at very low temperatures and even when there are larger temperature changes. FIG. 8 shows the temperature curve of aspirated natural gas TA as a function of time on the suction side of the first compression stage 9. Curve TB shows the temperature of natural gas on the discharge side of the first compression stage 9 as a function of time. Curve TC shows the temperature of natural gas on the discharge side of the second compression stage 10 as a function of time. From the embodiment example shown, it can be seen that labyrinth-sealed piston-compressors 11, 12 can be reliably operated over a range of temperatures between −150° C. and +100° C. The compressor 2 according to the invention also has the advantage that it can be started at pretty much any suction side temperature.

Possible methods of operation will be described in detail with reference to FIGS. 1 to 3. In the method for creating a supply of natural gas fuel for a combustion engine according to the invention, boil-off gas 6 is obtained from an LNG-storage tank 5 containing liquefied natural gas. Thereupon, the boil-off gas 6 is compressed in a compression stage 9, 10 consisting of a labyrinth-sealed piston-compressor 11, 12. Thereafter, the natural gas is compressed in a compression stage 13, 14 comprising a piston-compressor 15 sealed with piston rings or with labyrinths. The natural gas is thereby compressed to a pressure of between 100 Bar and 500 Bar, preferably to a pressure of between 150 Bar and 300 Bar and thereafter made available at an outlet 7.

Advantageously, a first and a second compression stage 9, 10 consist of labyrinth-sealed piston-compressors 11, 12 and a third and a fourth compression stage 13, 14 consist of piston-ring-sealed piston-compressor 15, such that the natural gas is preferably compressed in at least four compression stages 9, 10, 13, 14, where it is a particularly advantageous arrangement for there to be two series-connected compression stages or rather piston-compressors 12 in the second compression stage.

Following the second compression stage 10, it is advantageous to feed the natural gas to the third compression stage 13 via a non-return valve 16.

It is advantageous for at least one of the piston-compressors 11, 12, to comprise a bypass 20, 21, 22 and for the natural gas to be returned via the at least one bypass 20, 21, 22 such that the natural gas at the outlet 7 is at a required target pressure Psoll. In the embodiment shown in FIG. 2, the backflow through the bypasses 20, 21, 22 can be controlled such that the delivery pressure at outlet 7 is variable over a range of values from 100 Bar to 500 bar, preferably from 150 Bar to 300 Bar, and such that the demanded quantity of natural gas is variable over a range of values from 0% to 100%, such that compressor 2 has a variable discharge-side delivery pressure at outlet 7, which may be specified via the control input value 41. Thanks to the method according to the invention, the compressor 2 according to the invention is able to maintain the delivery pressure, as specified by the control input value 41, even if the combustion engine 32 consumes varying quantities of natural gas. Dependent on the respective positions of valves 23, 24, 25 a delivery quantity of between 0% and 100% can be recirculated via the relevant bypass 20, 21, 22. The possibility of reducing delivery quantity to 0%, or rather the possibility of a 100% recirculation rate in a bypass 20, 21, 22, has the advantage that the compressor can still be driven when no natural gas is being taken from the outlet 7. Depending on the arrangement, the electric motor driving the crankshaft 17a of the compressor 2 may, for example, only be able to start up a certain number of times per unit of time. For example, the electric motor may heat up during starting in such a way as to limit the number of new starts per hour. In this way, the bypasses 20, 21, 22 and the valves 23, 24, 25 allow the electric motor to continue running even if only a small quantity of natural gas, or even none at all, is taken from outlet 7.

Figure 9:
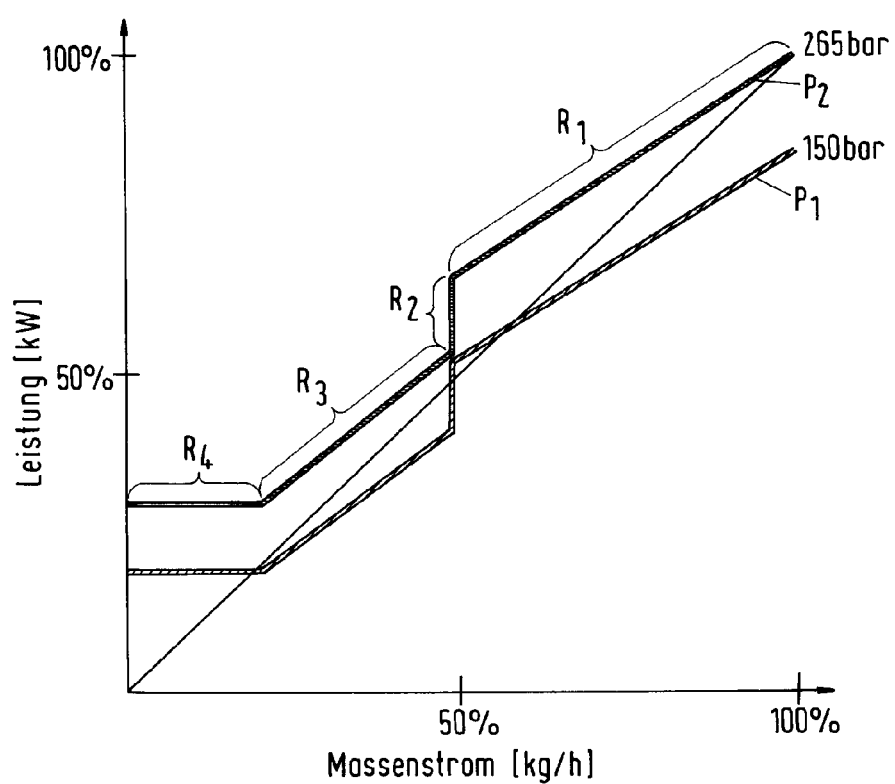
FIG. 9 a feedback control concept for controlling pressure and mass flux of the compressed natural gas.

FIG. 9 shows a feedback control concept for controlling pressure and mass flux of the compressed natural gas at outlet 7. In detail, FIG. 9 shows the percentage mass flux in kg/h as a function of the available power at driveshaft 27 at a pressure P1 of 150 Bar and at a pressure P2 of 265 Bar. The feedback control concept will be explained in detail with reference to FIG. 2 and curve P2 of FIG. 9. The section of curve P2 marked R1 is achieved by changing the position of valve 23 which, in turn, changes the returning flow rate in bypass 20. Also, the section of curve P2 marked R3 is achieved by changing the position of valve 25 which, in turn, changes the returning flow rate in bypass 22. Also, the section of curve P2 marked R4 is achieved by changing the position of valve 24 which, in turn, changes the returning flow rate in bypass 21. In this way, the mass flux of, or rather, the supply quantity of natural gas can be changed between 0% and 100%, with constant pressure maintained at the outlet 7. The same feedback control method applies for other pressures, for example for curve P1 with a pressure of 150 Bar. Along with fluctuations in mass flux, the arrangement of FIG. 2 can also compensate for pressure changes. Regulating devices 40a, 40b, 40c advantageously take the form of PI-controllers. Supposing a target pressure value 41 is given at regulating device 40a and the current pressure value 42d sinks below the specified target pressure value 41, then the regulating device 40a would partially or completely close valve 23, such that less natural gas flows back in bypass 20, with the effect that a larger quantity of natural gas is available at the outlet 7 and the pressure of natural gas at the outlet 7 rises. Regulating device 40b captures two current values 42a, 42b, a current entry value 42a and a current exit value 42b.

Two target values (not shown) are specified to regulating device 40b, one target entry value and one target exit value. If the current entry value 42a is smaller than the target entry value, then valve 24 is opened. If the target exit value is smaller that the current exit value 42, then valve is likewise opened. The same feedback control method also applies for regulating device 40c and the corresponding sensors and valve 25.

The compressor 2 and the combustion engine 32 are preferably operated, such that the combustion engine 32 sets a target pressure value Psoll for the natural gas that is to be delivered and such that the compressor is controlled in such a way that natural gas at outlet 7 is at the specified target pressure value Psoll.

It can prove advantageous to compress the natural gas oillessly in at least the first and second piston-compressors 11, 12.

It can also prove advantageous to cool the natural gas after a compression stage 9, 10, 13, 14.

It can prove advantageous for all piston-compressors 11, 12, 15 to be driven from a shared crankshaft 17a. Yet it can also prove advantageous to drive the labyrinth-sealed piston-compressor 11, 12 from a first shared crankshaft and to drive the piston-ring-sealed piston-compressor 15 from a second shared crankshaft. It can prove advantageous to flare off or reliquefy a portion of the compressed natural gas. It can prove advantageous to connect or disconnect an intercooler 31 between the first and second compression stages.

The invention claimed is:

1. Apparatus for providing a supply of natural gas fuel comprising:
    a compressor having an inlet for a stream of natural gas, wherein the inlet is configured for being placed in fluid communication with a liquid natural gas storage tank in order to provide a supply of boil-off gas from out of the liquid natural gas storage tank,
    an outlet which is configured for being placed in fluid communication with a natural gas supply pipe,
    wherein the compressor comprises a first and subsequently a second compression stage, wherein the first and the second compression stage comprise labyrinth-sealed piston-compressors or piston-ring-sealed piston-compressors, and wherein the first compression stage has a larger piston diameter than the second compression stage, and wherein the compressor comprises at least a third subsequent compression stage, which comprises a piston-ring-sealed piston-compressor or a labyrinth-sealed piston-compressor,
    wherein at least one compression stage includes a bypass with a controllable valve, which feeds an output of the at least one compression stage back to an input of the at least one compression stage, for controlling the delivery volume and/or the delivery pressure of the at least one compression stage,
    wherein there is a non-return valve and no other fluid communication between the second compression stage and the third compression stage, and
    wherein all compression stages upstream of the non-return valve are oil free.

2. Apparatus according to claim 1, wherein all of the compression stages are driven by a shared crank drive mechanism.

3. Apparatus according to claim 1, wherein all of the compression stages are mounted on a shared casing.

4. Apparatus according to claim 1, wherein the third and a fourth compression stage are in a shared cylinder.

5. Apparatus according to claim 1, wherein the second compression stage consists of two stages of compressors connected in series.

6. Apparatus according to claim 1, comprising a returning pipe between the compressor inlet and the non-return valve, for returning natural gas to the liquid natural gas storage tank.

7. Apparatus according to claim 1, wherein said natural gas fuel is supplied to a combustion engine.

8. The apparatus according to claim 1, wherein the first and the second compression stage comprise labyrinth-sealed piston-compressors.

9. The apparatus according to claim 8, wherein the third subsequent compression stage comprises a piston-ring-sealed piston-compressor.

* * * * *